United States Patent
Chang et al.

[11] Patent Number: 6,167,367
[45] Date of Patent: Dec. 26, 2000

[54] METHOD AND DEVICE FOR AUTOMATIC ERROR DETECTION AND CORRECTION FOR COMPUTERIZED TEXT FILES

[75] Inventors: Jyun-Sheng Chang; Tsuey-Fen Lin, both of Hsinchu, Taiwan

[73] Assignees: National Tsing Hua University, Hsinchu; Galaxy Software Services Ltd., Taipei, both of Taiwan

[21] Appl. No.: 08/914,225

[22] Filed: Aug. 9, 1997

[51] Int. Cl.[7] .............................. G06F 17/30; G06K 9/72
[52] U.S. Cl. ................................. 704/8; 382/229
[58] Field of Search .................. 704/1, 8, 9, 10; 707/535, 536, 532; 382/185, 178, 229, 230; 341/28

[56] References Cited

U.S. PATENT DOCUMENTS

| | | | |
|---|---|---|---|
| 5,261,009 | 11/1993 | Bokser | 382/178 |
| 5,617,488 | 4/1997 | Hong et al. | 382/229 |
| 5,684,891 | 11/1997 | Tanaka et al. | 382/178 |
| 5,734,749 | 3/1998 | Yamada et al. | 382/187 |
| 5,764,799 | 6/1998 | Hong et al. | 382/225 |

*Primary Examiner*—Vivian Chang
*Assistant Examiner*—Patrick N. Edouard
*Attorney, Agent, or Firm*—Bacon & Thomas

[57] ABSTRACT

A method and device for automatic error detection and correction for computerized text files uses a two-step segmentation method. A sentence of the computerized text file is first segmented at the first segmentation step into an original format and then converted into a correct sentence in the second segmentation step. In the first segmentation step the original sentence is segmented into a series of characters and the characters are analyzed so that the original phonetic or pictographic codes of the characters are revealed. The sentence in the original format is then converted into a series of phonetic representative codes and/or pictographic representative codes. Words consisting the sentence are then selected from a lexicon to reconstruct the sentence. The reconstructed sentence is then segmented again so that the errors in the original sentence are detected and corrections thereof are suggested.

14 Claims, 2 Drawing Sheets

METHOD AND DEVICE FOR AUTOMATIC ERROR DETECTION AND CORRECTION FOR COMPUTERIZED TEXT FILES

FIELD OF THE INVENTION

The present invention relates to a method and a device for automatic error detection and correction of computerized text files, and especially to a two-step error detection and correction method and device for computerized text files containing Chinese characters. The present invention uses a two-step segmentation method to improve the detection and the correction of errors contained in the text files.

BACKGROUND OF THE INVENTION

Due to the wide use of computer systems, using a computer to process all kinds of documentation has become a standard operation in contemporary business activities. In the processing of the computerized documentation, the correctness of the content is always required. As a result, to ensure the correctness has become in important task in the field of the computerized document processing.

In the processing of documentation files containing Chinese characters, such as Chinese text files (in simplified Chinese characters or in traditional Chinese characters) and Japanese text files, "errors" are always found in the files, no matter whether the files are input from a keyboard, a phonetic recognizer or an OCR (optical character recognizer) or retrieved from a text file.

Here, the term "error" generally pertains to two categories: typographic errors and wrong selections. In this invention, "typographic error" generally means omissions, deformations and dispositions in character strokes during the recognition or handwriting of the characters, and omissions, additions, duplications and mistakes in key striking, both happening during input of blocked characters such as Chinese characters. "Wrong selection" means selecting a wrong character instead of a correct character during the input. In addition, during the conversion of the simplified Chinese characters, as used in Mainland China, and the traditional Chinese characters, as used in Taiwan and Hong Kong, wrong selections are noted. These errors are called "errors" collectively in the following description of this invention.

In the past, errors contained in the text files are detected and corrected by human beings by way of reviewing whole content of the files. Since the reviewing is time consuming, the prior art provided some methods and devices to detect and correct the errors by a computer automatically or semi-automatically, so that the number of the errors in a text file may be reduced.

Taiwan patent number 59572 described to a "Automatic Wrong Character Detection Method for Chinese Language and its Detection Device". By using the method disclosed by this prior art, the errors contained in a Chinese text file may be detected automatically so that users may correct the errors based on the results of detection. The error detection method of this patent included: preliminary segmentation of the sentence in process, based on certain statistical data; selection of low-frequency single-character terms which are not frequently used; and determining the low-frequency terms to be errors. This patent disclosed an error detection method which can detect almost all the errors contained in a sentence. It, however, can not suggest how to correct the sentence and most of the "errors" it detected were not real "errors". Furthermore, a "table of combinations of character streams" used in this patent contained a huge number of data which resulted in low processing speed.

Taiwan patent application number 83103817 described to a "Method and Device for the Automatic Correction of Errors in Chinese Text Files". This patent disclosed a method to correct errors contained in a Chinese text file where all the characters of a sentence are converted into a series of similar-character clusters and the sentence is segmented according to the result of the conversion. The combinations (linkages) of the character streams in the sentence according to a "table of combinations for character streams" are assessed and given scores. Errors are detected based on the scores so obtained and corrections are suggested. Although this patent provided a useful method for the correction of the errors, the collection of the similar character and the table of linkage of character stream contained, again, a huge number of data As a result, the segmentation and the assessment of the linkage score can not be processed at higher speed.

It is thus an urgent need in the field of document processing to have a method and a device for error detection and correction for computerized text files that can detect almost all the errors contained in a text file, can separate the real errors and can be processed automatically. There is also a need to provide a method and a device for error detection and correction for computerized blocked character text files that can detect errors caused by a variety of reasons.

OBJECTIVES OF THE INVENTION

The purpose of this invention is to provide a method and a device for error detection and correction for computerized blocked character text files that can detect almost all the errors contained in a text file.

Another purpose of this invention is to provide a device for error detection and correction for computerized blocked character text files that can detect the real errors contained in a text file.

Another purpose of this invention is to provide a device for error detection and correction for computerized blocked character text files that can be processed automatically at a higher speed.

Another purpose of this invention is to provide a device for error detection and correction for computerized blocked character text files that can detect errors caused by a variety of reasons.

SUMMARY OF THE INVENTION

According to the present invention, a method for automatic error detection and correction for computerized text files using a two-step segmentation approach is disclosed. By the first-step segmentation, the sentence is converted into its original phonetic/pictographic format with no errors. By the second-step, the sentence is converted into a correct sentence. In the first segmentation an original sentence to be processed is segmented into a series of characters and the characters are analyzed so that the original phonetic or pictographic codes of the characters are known. The sentence with the original codes is then converted into a series of phonetic representative codes and/or pictographic representative codes. Words making up the sentence are then selected from a lexicon to reconstruct the sentence. The reconstructed sentence is then segmented again so that the errors in the original sentence are detected and corrections thereof are suggested or are executed.

The above and other purposes and advantages of this invention can be clearly understood from the following detailed description by referring to the following drawings.

DESCRIPTION OF THE DRAWINGS

Table I illustrates a part of the look-up-table for the pictographic representative codes suited for this invention.

Table II shows candidates and scores of an OCR recognized sentence.

DETAILED DESCRIPTION OF THE INVENTION

The following is a detailed description of the method and device for error detection and correction for computerized text files of this invention.

Although it is not intended to limit the scope of this invention, the inventor found that, in most cases, errors contained in a computerized text file are caused by characters with phonetic similarity, with pictorial similarity or with ambiguity in the conversion between the simplified Chinese characters and the traditional Chinese characters. When phonetic similarity is the case, errors are found in text files that are input with the phonetic input methods. For example, an error for "平均值" could be "平均質" (same pronunciation) and errors for "必會" could be "避諱" or "閉會" (same pronunciation). If pictorial similarity is the case, it happens when the text is input with an input method based on the pictorial structure of the characters, such as the Changjie input method, or by OCR. For example, under the Changjie method, "市場形劫" (wrong) could be input instead of "市場形勢" (correct) because the input codes for both "勢" and for "劫" are "GIKS". Under OCR input, "已經" could be mistaken for "正經" because of the similarity in the pictorial structures. If the conversion between different Chinese character formats is the case, errors happen when the correspondence between characters is not one-to-one. A good example is mistaking "後面" for "后面" because the correspondent character for "后" (simplified character) in the traditional character system are "后" and "後".

Figure 1:
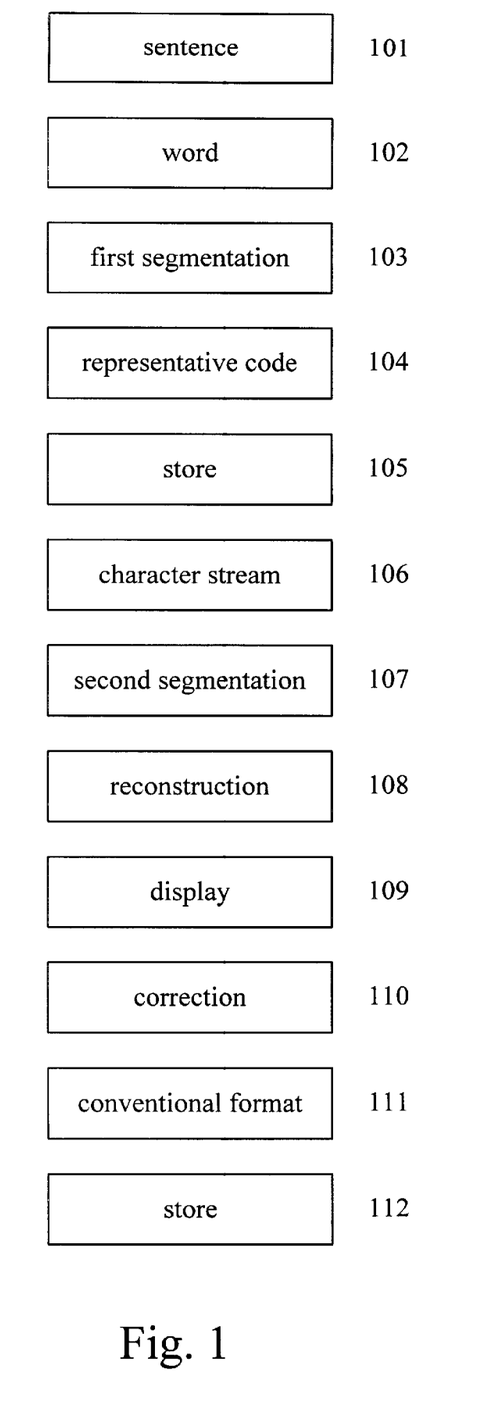
FIG. 1 illustrates the flow chart of the method for error detection and correction for computerized text files of this invention.

In order to provide a method for error detection and correction for text files which can detect and correct errors caused by different reasons, a two-step segmentation approach is disclosed. FIG. 1 illustrates the flow chart of the method for automatic detection and correction for computerized text files of this invention. The invented method will be described by referring to this figure.

As shown in the figure, in detecting the errors contained in a text file, at 101 a sentence of the text file is first taken out for processing. For convenience, a "sentence" is decided according to the punctuation of the sentence. The characters between two punctuations are deemed a "sentence" as a unit of processing.

Under this step, all the characters are represented by a code, according to a conventional coding system. Suited coding systems include: the BIG5 coding system and the GB coding system.

At 102, a lexicon which contains frequently used words, encoded under the conventional coding system, is used so that words constituted by character stream in the sentence with various length are picked-out by looking up the lexicon. The word streams so picked may overlap with one another. At 103 the sentence is segmented into a stream of words, based on a certain calculations using factors such as: lengths, existing frequencies and probabilities of combination of the terms as selected. The above steps are called the first segmentation step and can be executed with any applicable prior art. One good approach for this first segmentation is the method disclosed in Taiwan patent application number 81105610: "Method and Device for the Compression of Chinese Text Files" which is taken for reference in this invention.

In short, in the first-step segmentation, the sentence is preliminarily segmented according to a conventional dictionary (lexicon) in order to facilitate the following processing.

Figure 2:
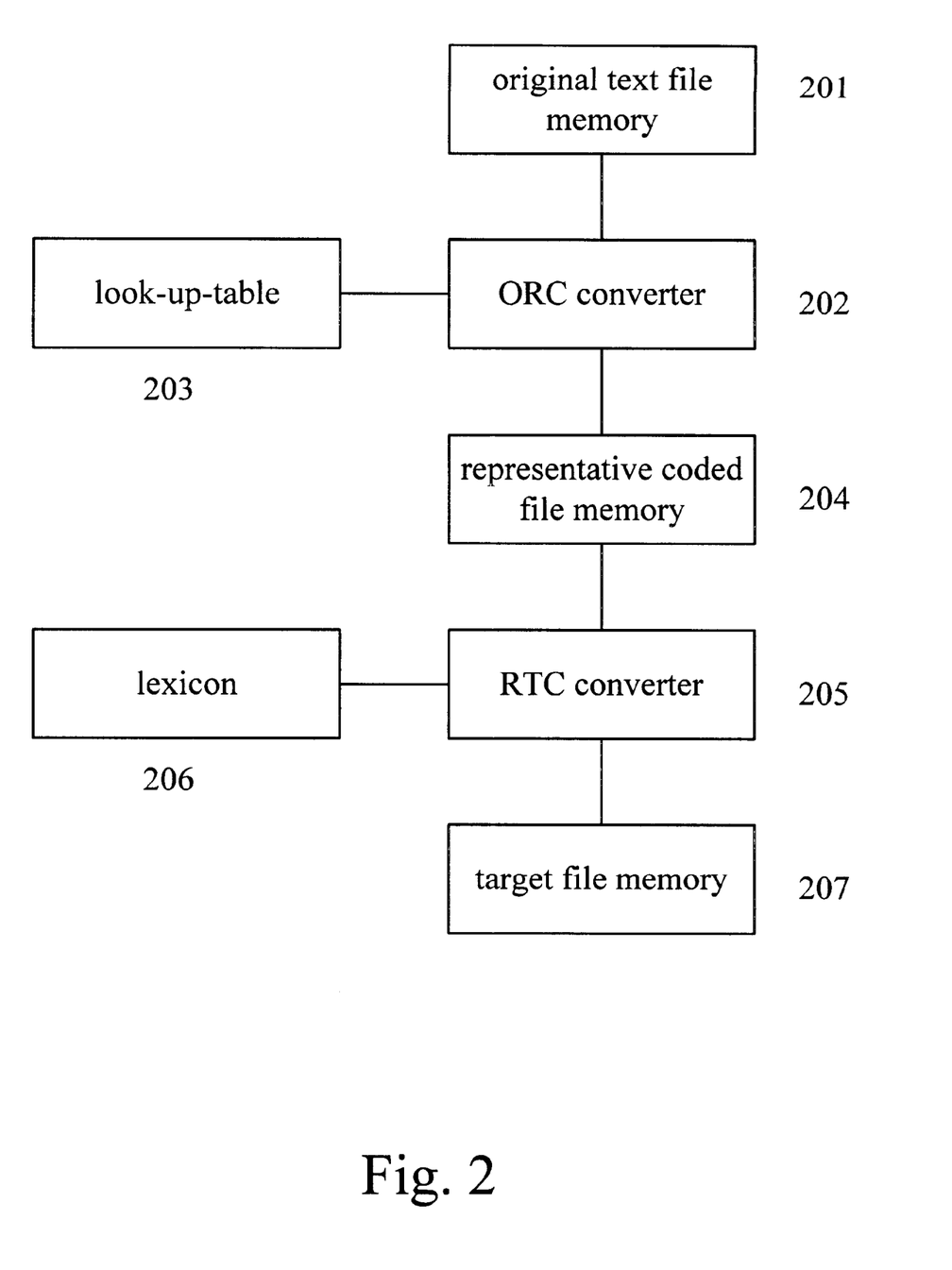
FIG. 2 illustrates the system schematics of the second-step segmentation of the method and device for error detection and correction for computerized text files of this invention.

FIG. 2 shows the system schematics of the second segmentation subsystem of this invention. As shown in the figure, the second segmentation subsystem includes: an original text file memory 201 to store the original text file; an original-to-representative-code (ORC) converter 202 to convert the text file into a format constituted by a representative code system; a representative code table 203 which is a look-up-table comprising representative codes and characters represented by the representative codes respectively; a representative coded file memory 204 to store the text file converted by said ORC converter 202; a representative-to-target-code (RTC) converter 205 to convert the text file into a target text file; a lexicon 206 which is also a look-up-table comprising target codes and characters represented by phonetic and pictographic codes; and a target file memory 207 to store the target text file.

In the embodiment of this invention, if the representative code table 203 is a phonetic code table, the characters can be represented by their pronunciations respectively. As a result, characters with same pronunciation are represented by the same phonetic code. On the other hand, if a pictorial code table is applied, a group of characters which are similar in stroke structure or characters which tend to be mixed up are represented by a same code. Here characters represented by the same code is called a cluster. It is recommended that the phonetic or pictorial code of one character of a cluster, under the conventional code systems, is selected as the code representing the cluster.

Table I illustrates a part of the pictorial representative code table 203 applicable in this invention. In this table, column 1 shows the characters of each cluster, column 2 and 3 show their Changjie codes and column 4 shows the representative code of every cluster.

In addition, if the table 203 is a table of simplified and traditional Chinese characters, a cluster shall include at least one simplified Chinese character and its corresponding traditional Chinese characters and may be represented by its phonetic code under the conventional coding system.

When a sentence is converted into the format of the representative code at 104, it is stored in the representative coded file memory 204 at 105. At 106 the RTC converter 205 looks up the lexicon 206 and picks up words that have the same codes with that of any character stream of the representative coded sentence. Here, words contained in the lexicon 206 are coded with the representative codes. At 107 the RTC converter 205 segments the representative coded sentence into word streams which are not overlapping one another. During the second segmentation, the RTC converter 205 calculates the score of every possible combination of the character streams according to the lengths, frequencies, probabilities of combination and number of changed characters of the character streams. Details of the calculation will be described below. At 108, the sentence is reconstructed by the word stream where the combination of the words has the highest score.

If necessary, the RTC converter 205 may display the results of the second segmentation at 109 so that users may decide to accept or to reject the correction. If no such confirmation is available, or if the user confirms the correction, the RTC converter corrects the sentence accordingly at 110, converts the sentence into a conventional format according to the target code table 206 at 111 and stores the sentence in the target file memory 207 at 112.

In the embodiment of this invention, the method with which the RTC converter 205 calculates the score of the combination of the character streams may be any applicable approach. For example, the method disclosed in the above-said Taiwan patent application number 83103817 will be a good example. It is, however, found that the following calculation may provide better effects.

In order to select a proper segmentation of a sentence, a series of character streams $W_i$, i=1 to n, constituting said sentence is found where $$\text{Score} = \sum_{i=1}^{n} 20 \times |W_i| - \log 10 \text{Prob}(W_i) - \log 10 \text{Prob}(POS_i / POS_{i-1}) - 30 \times C_i$$

has the greatest value, and wherein $POS_i$ is the POS (part of speech) of $W_i$ and $C_i$ is the number of characters changed in $W_i$. In case of a tie, the choice is arbitrarily or all choices are presented to the user for confirmation.

Definitions $|W_i|$: Number of characters in $W_i$. For example, "快樂" has two characters so that |快樂| is 2 and "快" has one character so that |快| is 1.

$\text{Prob}(W_i)$: Frequency of $W_i$ to exist in general Chinese text. For example, the word "快樂" appears 100 times in a collection of articles containing 1 million terms so that Prob(快樂) is 0.001.

$\text{Prob}(POS_i | POS_{i-1})$: Probability of combination of $W_i$ and $W_{i-1}$, i.e., the probability that a word with part-of-speech (POS) X to follow a word with POS Y in general articles. For example, if, in one document containing 100 verbs, the total number of nouns to follow a verb is 32, Prob (noun|verb) is 0.32.

$C_i$: Number of characters changed, i.e., the number of characters that are different from its corresponding character in the original sentence but are considered during the second segmentation step. For example, in the second segmentation, "形勢" is considered to replace "形刼". Then the number of character changed is 1.

Although it is not intended to limit the scope of this invention, the above rule was recommended based on some analysis of primarily Chinese documents and statistic data, as follows:

1. The most simple and effective approach to segmentation is the "Doctrine of Priority of Longer Terms" which provides higher than 90% of correct segmentation. However, if the numbers of characters of two words are equal, it will be necessary to have other rules to determine the priority.

2. When the number of characters of two words are equal, in most cases the probability of combination of terms can help to determine the priority. The probability of combination of terms can be obtained by analyzing a large quantity of articles. For example, according to statistic results, degree adverb adjective shall have priority over temporal adverb|verb during the segmentation.

3. The priority may be different because of the words collected in a lexicon or the type of the article to be processed. The rule shall be adjusted according to the type of the article. As a result, it is possible to provide different rules for different type of applications.

EMBODIMENTS

The following examples are for different embodiments of the present invention.

EMBODIMENT I

Errors Because of Phonetic Similarity

A sentence is picked up from a text file stored in the original text file memory. The sentence includes characters between two punctuations, as follow:

"其平均質頗爲可信".

This sentence is encoded with the BIG5 coding system, as follow:

其平均質頗爲可信

*A8E4 A5AD A7A1 BDE8 BBE1 ACB0 A569 AB48*

In this sentence, "質" is a phonetic error derived from "值", since they have the same pronunciation.

At the first segmentation, a lexicon is used to determine the words constituting this sentence, as follows:

|其|平均|質|頗爲|可信|.

Because the case is a phonetic error, only the phonetic error detection and correction will be described. In doing this, the representative code table 203 is used and the representative codes (phonetic codes) of the characters are found. The following result is stored in the representative coded file memory 204 for further processing:

| 其 | 平 | 均 | 質 | 頗 | 爲 | 可 | 信 |
| ↓ | ↓ | ↓ | ↓ | ↓ | ↓ | ↓ | ↓ |
| gi² | ping² | jun | zhi² | po³ | wei² | ker³ | xin⁴ |

The RTC converter 205 uses the phonetic coded lexicon or term book 206 to pick up character streams having the same codes and the POS of the character streams (terms), as follow:

| 其 | 平均 | 質 | 頗爲 | 可信 |
| ↓ | ↓↓ | ↓ | ↓↓ | ↓↓ |
| Nh | VH | Na | Df | VH |, and

| 其 | 平均值 | 頗爲 | 可信 |
| ↓ | ↓↓↓ | ↓↓ | ↓↓ |
| Nh | Na | Df | VH |, etc.

The second segmentation is executed, based on the lengths, frequencies, probabilities and number of changed characters of the character streams.

The Scores of the two combinations are calculated:

$$Score = \sum_{i=1}^{n} 20 \times |W_i| - \log 10 Prob(W_i) - \log 10 Prob(POS_i / POS_{i-1}) - 30 \times C_i$$

We have, for example:

$|W_i|$ for "平均值" is 3 and for "平均" is 2;

$Prob(W_i)$ for "平均值" is 1, for "平均" is 101 and for "質" is 33;

$C_i$ for "平均值" and "平均質" is 1.

After calculation according to equation 1, we have the following Scores:

Score for | 其 | 平均 | 質 | 頗爲 | 可信 |: $2.498*10^{-8}$

Score for | 其 | 平均值 | 頗爲 | 可信 |: $3.194*10^{-5}$

As a result, the following sentence is determined to be correct:

|其|z,21 值|頗爲|可信|.

EMBODIMENT II

Errors Because of Pictorial Similarity

A sentence is picked up from a text file stored in the original text file memory. The sentence includes characters between two punctuations, as follow:

"造成市場形劫及力量".

In this sentence, "劫" is a phonetic error of "勢", since they have the same Changjie code.

At the first segmentation, a lexicon is used to determine the terms constituting this sentence, as follow:

|造成|市場|形劫|及|力量|

Because the case is a pictorial error, only the pictorial error detection and correction will be described. In doing so, the representative code table 203 is used and the representative codes of the characters are found. The following result is stored in the representative coded file memory 204 for further processing:

| 造成 | 市場 | 形 | 劫 | 及 | 力量 |
↓ ↓ ↓ ↓ ↓ ↓
| 胴怕 | 哗佞 | 俠 | 劫 | 扳 | 六馬 |

The RTC converter 205 uses the pictorial coded term book 208 to pick up character streams having the same codes and the POS of the word streams, as follow:

| 造成 | 市場 | 形 | | 劫 | 及 | 力量 |

| 胴怕 | 哗佞 | 俠 | | 劫 | 扳 | 六馬 |

|VK33|Nc30|Na42|VD45|Ca24|Na41| ; and

| 造成 | 市場 | 形勢 | 及 | 力量 |

| 胴怕 | 哗佞 | 俠劫 | 扳 | 六馬 |

|VK33|Nc30|Na99|Ca24|Na41| , etc

The "pictorial code table" includes a look-table of a list of clusters containing characters that are similar in stroke structure. For example, in the above "胴" represents the cluster including "造", "週"; "怕" represents the cluster including "成", "叼", "怕" etc.; "哗" the cluster including "市", "辛", "哗" etc.; and so on.

The second segmentation is executed, based on the lengths, existing frequencies, probabilities and number of changed characters of the character streams.

The Scores of the two combinations are calculated:

$$Score = \sum_{i=1}^{n} 20 \times |W_i| - \log 10 Prob(W_i) - \log 10 Prob(POS_i / POS_{i-1}) - 30 \times C_i$$

After calculation according to equation 1, we have the following Scores:

Score for | 造成 | 市場 | 形 | 劫 | 及 | 力量 |: $3.697*10^{-5}$

Score for | 造成 | 市場 | 形勢 | 及 | 力量 |: $8.184*10^{-2}$

As a result, the following sentence is determined correct:

|造成|市場|形勢|及|力量|.

This approach is applicable to any errors resulted from pictorial similarity errors, in particular text files input with Changjie Code System and text files input with OCR.

EMBODIMENT III

Errors Because of Conversion Between Complex and Simplified Chinese Characters A sentence is picked up from a text file stored in the original text file memory. The sentence includes characters between two punctuations, as follow:

"老板從后面端來湯面和鹵豆腐干".

This sentence is an incomplete conversion of "老闆從麵面端來湯麵和滷豆腐" because "端", "后", "面" and "鹵" exist in both the traditional and the simplified systems but should be "闆", "後", "麵" and "滷" in the traditional system, so far as this sentence is concerned.

At the first segmentation, a lexicon is used to determine the terms constituting this sentence, as follow:

|老板|從|后|面|端|來|湯|面|和|鹵|豆腐干|.

Because in this case the errors occur in the conversion between different Chinese systems, only the conversional error detection and correction will be described. In doing so, the representative code table 203 is used and the representative codes of the characters are found. The following result is stored in the representative coded file memory 204 for further processing:

| 老板 | 從 | 后 | 面 | 端 | 來 | 湯 | 面 | 和 | 鹵 | 豆腐干 |.
↓ ↓ ↓ ↓ ↓ ↓ ↓ ↓ ↓ ↓ ↓↓
老板 從 后 面 端 來 湯 面 和 鹵 豆腐干

The RTC converter 205 uses the conversional coded term book 206 to pick up character streams having the same codes and the POS of the word streams, as follows:

| 老板 | 從 | 后 | 面 | 端 | 來 | 湯 | 面 | 和 | 鹵 | 豆腐 | 干 |
↓↓ ↓ ↓ ↓ ↓ ↓ ↓ ↓ ↓ ↓ ↓↓ ↓
老板 從 后 面 端 來 湯 面 和 鹵 豆腐 干
↓↓ ↓ ↓ ↓ ↓ ↓ ↓ ↓ ↓ ↓ ↓↓ ↓
| Na | Pb | Na | Na | Vc | Vc | Na | Na | Ca | Vc | Na | Na | ; and

| 老闆 | 從 | 後面 | 端 | 來 | 湯麵 | 和 | 滷 | 豆腐乾 |
↓↓ ↓ ↓↓ ↓ ↓ ↓↓ ↓ ↓ ↓↓↓
老板 從 后面 端 來 湯面 和 鹵 豆腐干
↓↓ ↓ ↓↓ ↓ ↓ ↓↓ ↓ ↓ ↓↓↓
| Na | Pb | Nc | Vc | Vc | Na | Ca | Vc | Na |, etc.

The "conversional code table" includes a look-up-table of a list of simplified Chinese characters and their respectively corresponding traditional Chinese characters and the clusters are represented by one of the conditional characters.

The second segmentation is executed, based on the lengths, existing frequencies, probabilities and number of changed characters of the character streams.

The Scores of the two combinations are calculated:

$$\text{Score} = \sum_{i=1}^{n} 20 \times |W_i| - \log10\text{Prob}(W_i) - \log10\text{Prob}(POS_i / POS_{i-1}) - 30 \times C_i$$

After calculation according to equation 1, we have the following Scores:

Score for | 老板 | 從 | 后 | 面 | 端 | 來 | 湯 | 面 | 和 | 鹵 | 豆腐干 |: $1.876 \times 10^{-9}$.

Score for | 老板 | 從 | 後面 | 端 | 來 | 湯麵 | 和 | 滷 | 豆腐干 |: $3.284 \times 10^{-3}$.

As a result, the following sentence is determined correct:

|老板|從|後面|端|來|湯麵|和|滷|豆腐干|.

EMBODIMENT IV

Errors From OCR

A piece of paper recorded with the following sentence is scanned by an image scanner:

"發出金屬一樣響脆的聲音".

The scanned image is recognized and the candidates are shown in Table II:

As a result of evaluation, the following sentence is recognized:

"發出金石一樣饗脆的聲音".

At the first segmentation, the sentence is segmented into:

|發出|金|石|一樣|饗|脆|的|聲音|.

Because the case is OCR errors, only the OCR error detection and correction will be described. In doing so, the representative code table 203 is used and the representative codes of the characters are found. The following result is stored in the representative coded file memory 204 for further processing:

| 發出 | 金 | 石 | 一樣 | 饗 | 脆 | 的 | 聲音 |
↓↓ ↓ ↓ ↓↓ ↓ ↓ ↓ ↓↓
| 登山 | 全 石 | 一株 | 響 | 脫 | 約 | 聲音 |

The RTC converter 205 uses the pictorial coded term book 206 to pick up character streams having the same codes and the POS of the word streams as follow:

| 發出 | 金 | 石 | 一樣 | 饗 | 脆 | 的 | 聲音 |
| 登山 | 金 | 石 | 一株 | 響 | 脫 | 約 | 聲音 |
| VR | Na | Na | Da | A | A | Ta | Na |; and

| 發出 | 金 屬 | 一樣 | 響 脆 | 的 | 聲音 |
| 發山 | 金 石 | 一株 | 響 脫 | 約 | 聲音 |
| VR | Na | Da | V H | Ta | Na |.

The "OCR code table" includes a look-up-table of a list of clusters containing characters that are similar in stroke structure. For example, in the above "登" represents the cluster including "發", "登" and "澄"; "山" represents the cluster including "山", "出", "仙", etc.; "全" represents the cluster including "全", "金", "仝" etc.; and so on.

The second segmentation is executed, based on the lengths, frequencies, probabilities and number of changed characters of the character streams.

The Scores of the two combinations are calculated:

$$\text{Score} = \sum_{i=1}^{n} 20 \times |W_i| - \log10\text{Prob}(W_i) - \log10\text{Prob}(POS_i / POS_{i-1}) - 30 \times C_i$$

After calculation according to equation 1, we have the following Scores:

Score for | 發出 | 金 | 石 | 一樣 | 饗 | 脆 | 的 | 聲音 |: $2.19 \times 10^{-12}$.

Score for | 發出 | 金屬 | 一樣 | 響脆 | 的 | 聲音 |: $3.86 \times 10^{-9}$.

As a result, the following sentence is determined to be correct:

|發出|金屬|一樣脆|的|聲音|.

It is noted that corrected characters that may not exist in the list of the candidates can be suggested, when this invention is applied.

EMBODIMENT V

Errors in Japanese Text Files

A sentence is picked up from a text file stored in the original text file memory. The sentence includes characters between two punctuations, as follows:

"それでは自然化学を研究する".

As shown, in the above sentence, "化学" is a phonetic error for "科学".

At the first segmentation, the sentence is segmented, according to a Japanese lexicon, into:

| それでは | 自 然 | 化 学 | を | 研 究 | する |

| So re de wa | Shi zen | Ka gaku | O | Ken Kyuu | Su ru |

Because the case is phonetic errors in Japanese language, only the Japanese-phonetic error detection and correction will be described. In doing so, the RTC converter 205 uses the Japanese term-phrase coded term book 208 to pick up character streams having the same codes and the POS of the word stream, as follows.

| それでは | 自 然 | 化 学 | を | 研 究 | する |

| So re de wa | Shi zen | Ka gaku | O | | Ken Kyuu | Su ru |

| Conj. | noun | noun | Object | Verbal noun | Verb III | and

| それでは | 自 然 化 学 | を | 研 究 | する |

| So re de wa | Shi zen Ka gaku | O | Ken Kyuu | Su ru |

| Conj. | noun | Object | Verbal noun | Verb III | etc.

The second segmentation is executed, based on the lengths, frequencies, probabilities and number of changed characters of the character streams.

The Scores of the two combinations are calculated:

$$\text{Score} = \sum_{i=1}^{n} 20 \times |W_i| - \log 10 \text{Prob}(W_i) - \log 10 \text{Prob}(POS_i / POS_{i-1}) - 30 \times C_i$$

After calculation according to equation 1, we have the following Scores:

Score for | それでは | 自 然 | 化 学 | を | 研 究 | する |: $3.71 \times 10^{-9}$.

Score for | それでは | 自 然 化 学 | を | 研 究 | する |: $2.92 \times 10^{-6}$.

As a result, the following sentence is determined correct:

| それでは自然化学を研究する |.

EFFECTS OF THE INVENTION

As shown in the above description, the present invention provides a novel approach for the error detection and correction for computerized text files so that high detection rate, high accuracy and high speed can be achieved. The present invention is not only applicable to Chinese text files but also to text files in Japanese and other languages. In the present invention, a POS combination table is disclosed. This table includes about 1,000 combinations. While in the prior art, a term-combination table is suggested and includes almost 1 million combinations, the present invention can be executed at a higher speed. Furthermore, the invented method does not only detect errors but also corrects errors. It goes without saying that the suggested corrections may include characters that does not exist in the original text file.

As the present invention has been shown and described with reference to preferred embodiments thereof, those skilled in the art will recognize that the above and other changes may be made therein without departing from the spirit and scope of the invention.

TABLE I

| 52 | 小 | NC | 弓金 | 酒 | 45 |
|---|---|---|---|---|---|
| 53 | 尢 | KU | 大山 | 尢 | 38 |
| 54 | 尸 | S | 尸 | 馬 | 37 |
| 55 | 山 | U | 山 | 山 | 1 |
| 56 | 川 | LLL | 中中中 | 唎 | 5 |
| 57 | 工 | MLM | 一中一 | 酒 | 45 |
| 58 | 己 | SU | 尸山 | 六 | 121 |
| 59 | 已 | SU | 尸山 | 六 | 121 |
| 60 | 巳 | RU | 口山 | 匈 | 51 |
| 61 | 巾 | LB | 中月 | 巾 | 30 |
| 62 | 干 | MJ | 一十 | 飯 | 45 |
| 63 | 廾 | JJ | 十十 | 姨 | 30 |
| 64 | 弋 | IP | 戈心 | 俠 | 39 |
| 65 | 弓 | N | 弓 | 了 | 33 |
| 66 | 才 | DH | 木竹 | 匈 | 51 |
| 67 | 丑 | NG | 弓土 | 了 | 33 |
| 68 | 歹 | MYVS | 一卜女尸 | 丐 | 1 |
| 69 | 不 | MF | 一火 | 不 | 3 |
| 70 | 中 | L | 中 | 唎 | 5 |
| 71 | 丰 | QJ | 手十 | 六 | 121 |
| 72 | 丹 | BY | 月卜 | 始 | 48 |
| 73 | 之 | INO | 戈弓人 | 了 | 33 |
| 74 | 尹 | SK | 尸大 | 核 | 40 |
| 75 | 予 | NINN | 弓戈弓弓 | 予 | 1 |
| 76 | 云 | MMI | 一一戈 | 佞 | 50 |
| 77 | 井 | TT | 廿廿 | 柴 | 31 |
| 78 | 互 | MVNM | 一女弓一 | 互 | 1 |
| 79 | 五 | MDM | 一水一 | 岑 | 35 |
| 80 | 尧 | YHN | 卜竹弓 | 尢 | 38 |
| 81 | 仁 | OMM | 人一一 | 佞 | 50 |
| 82 | 什 | OJ | 人十 | 尢 | 38 |
| 83 | 仃 | OMN | 人一弓 | 佞 | 50 |
| 84 | 仆 | OY | 人卜 | 竘 | 39 |
| 85 | 仇 | OKN | 人大弓 | 窘 | 39 |
| 86 | 仍 | ONHS | 人弓竹尸 | 飯 | 45 |
| 87 | 今 | OIN | 人戈弓 | 岑 | 35 |
| 88 | 介 | OLL | 人中中 | 剌 | 37 |
| 89 | 仄 | MO | 一人 | 岑 | 35 |
| 90 | 元 | MMU | 一一山 | 佞 | 50 |
| 91 | 允 | IHU | 戈竹山 | 匈 | 51 |
| 92 | 内 | OB | 人月 | 窘 | 39 |
| 93 | 六 | YC | 卜金 | 六 | 121 |
| 94 | 兮 | CMVS | 金一女尸 | 兮 | 1 |
| 95 | 公 | CI | 金戈 | 窘 | 39 |
| 96 | 冗 | BHN | 月竹弓 | 多 | 16 |
| 97 | 凶 | UK | 山大 | 哗 | 41 |
| 98 | 分 | CSH | 金尸竹 | 扳 | 50 |
| 99 | 切 | PSH | 心尸竹 | 切 | 39 |
| 100 | 刈 | KLN | 大中弓 | 耽 | 33 |
| 101 | 勻 | PIM | 心戈一 | 六 | 121 |
| 102 | 勾 | PI | 心戈 | 匈 | 51 |

TABLE II

| 10 | 發 | 03886 | 登 | 04408 | 交 | 04775 | 番 | 04797 | 撰 | 04799 | 蛋 | 04849 | 務 | 04870 | 蚤 | 05017 | 脊 | 05020 | 妾 | 05038 |
|---|---|---|---|---|---|---|---|---|---|---|---|---|---|---|---|---|---|---|---|---|
| 10 | 出 | 03464 | 山 | 03961 | 由 | 04616 | 土 | 04623 | * | 04880 | 上 | 05015 | 止 | 05057 | 去 | 05129 | 臼 | 05301 | 少 | 05313 |
| 10 | 金 | 03166 | 全 | 03285 | 令 | 03754 | 企 | 03781 | 合 | 03878 | 舍 | 03984 | 奎 | 04043 | 今 | 04054 | 含 | 04448 | 奄 | 04475 |
| 10 | 石 | 04940 | 鳳 | 05059 | 承 | 05244 | 碼 | 05315 | 媽 | 05405 | 腐 | 05427 | 馬 | 05466 | 尼 | 05486 | 奶 | 05540 | 嗎 | 05542 |
| 10 | — | 02000 | - | 02010 | — | 02030 |  | 00000 |  | 00000 |  | 00000 |  | 00000 |  | 00000 |  | 00000 |  | 00000 |
| 03 | 樣 | 03726 | 棟 | 04088 | 樣 | 04402 | 株 | 04417 | 梗 | 04548 | 樓 | 04559 | 穀 | 04654 | 採 | 04682 | 稼 | 04702 | 操 | 04721 |
| 10 | 罎 | 04685 | 容 | 05061 | 率 | 05129 | 箏 | 05183 | 墾 | 05200 | 樂 | 05208 | 年 | 05254 | 孚 | 05282 | 卒 | 05288 | 身 | 05328 |
| 10 | 脆 | 03468 | 跣 | 03950 | 胞 | 04359 | 脫 | 04403 | 梳 | 04494 | 施 | 04585 | 腕 | 04647 | 舵 | 04766 | 傀 | 04921 | 肚 | 04922 |
| 10 | 的 | 03486 | 釣 | 04119 | 約 | 04121 | 酌 | 04474 | 鉤 | 04531 | 竹 | 04662 | 幼 | 04684 | 啊 | 04692 | 叶 | 04768 | 助 | 04778 |
| 10 | 孛 | 04191 | 芽 | 04851 | 奈 | 04871 | 癸 | 04875 | 譽 | 04934 | 公 | 04935 | 祭 | 04940 | 弊 | 04946 | 咚 | 04952 | 茶 | 04955 |
| 10 | 音 | 03232 | 昔 | 03708 | 辛 | 03811 | 寺 | 03944 | 青 | 04024 | 者 | 04042 | + | 04125 | 卡 | 04130 | 千 | 04139 | 手 | 04251 |

What is claimed is:

1. A device for the detection and correction of errors contained in an original text file that includes text consisting essentially of non-alphabetic blocked characters, comprising:

an original text file obtaining means, comprising an original text file memory and, said text file obtaining means being used to obtain a series of non-alphabetic blocked characters from a text file to be processed as a "sentence" and to store said sentence in said original text file memory.

2. The device according to claim 1 wherein said representative-to-target code converter calculates the scores according to the factors comprising:

$|W_i|$: Number of characters of character stream $W_i$, i=1 to n;

Prob($W_i$): Frequency of $W_i$ to exist in articles;

Prob($POS_i|POS_{i-1}$): Probability of a term with POS (part-of speech) of $W_i$ to follow a term with POS of $W_{i-1}$ in articles; and $C_i$: Number of characters in the picked-up character stream that are different from its corresponding character in the original character stream.

3. The device according to claim 2 wherein said representative-to-target code converter calculates the scores according to the following equation:

$$\text{Score} = \sum_{i=1}^{n} 20 \times |W_i| - \log 10 \text{Prob}(W_i) - \log 10 \text{Prob}(POS_i / POS_{i-1}) - 30 \times C_i.$$

4. The device according to any one of claims 1, 2 and 3, wherein said representative-to-target code converter further comprises an interface means which comprises a display such that the character streams with higher scores are displayed in said display.

5. The device according to any one of claims 1, 2 and 3, wherein said representative code table is a phonetic code table having characters encoded according to their pronunciations wherein characters with same pronunciation are encoded with the same code.

6. The device according to any one of claims 1, 2 and 3, wherein said representative code table is a pictorial code table having characters encoded according to their stroke structures wherein characters with similar stroke structure are encoded with the same code.

7. The device according to any one of claims 1, 2 and 3, wherein said representative code table is a conversional code table having characters encoded according to their relation between the complex Chinese system and the simplified Chinese system wherein characters that are corresponding in the complex Chinese system and the simplified Chinese system are encoded with the same code.

8. A method for the detection and correction of errors contained in a text file that includes text consisting essentially of non-alphabetic blocked characters, comprising:

obtaining a series of blocked characters from a text file to be processed and treating said series of character stream as a "sentence";

fractionating said sentence into a series of non-overlapping character streams;

converting, according to a representative code table, codes of the blocked characters of said sentence into representative codes;

fractionating said representative coded sentence into at least one series of non-overlapping character streams according to a representative coded term book by picking up terms with character streams having same representative codes from said representative coded term book;

calculating a score of a combination of said at least one series of character streams; and outputting the series of character streams with the a highest score.

9. The method according to claim 8 wherein said score is calculated according to at least the following factors:

$|W_i|$: Number of characters of character stream $W_i$, i=1 to n;

Prob($W_i$): Frequency of $W_i$ to exist in articles;

Prob($POS_i|POS_{i-1}$): Probability of a term with POS of $W_1$ to follow a term with POS of $W_{i-1}$ in articles; and $C_i$: Number of characters in the picked-up character stream that are different from its corresponding character in the original character stream.

10. The method according to claim 9 wherein said score is calculated according to the following equation:

$$\text{Score} = \sum_{i=1}^{n} 20 \times |W_i| - \log 10 \text{Prob}(W_i) - \log 10 \text{Prob}(POS_i / POS_{i-1}) - 30 \times C_i.$$

11. The method according to any one of claims 8, 9, and 10, further comprising a step of displaying series of character streams with highest scores.

12. The method according to any one of claims 8, 9, and 10, wherein said representative code table is a phonetic code table having characters encoded according to their pronunciations wherein characters with same pronunciation are encoded with the same code.

13. The method according to any one of claims 8, 9, and 10, wherein said representative code table is a pictorial code table having characters encoded according to their stroke structures wherein characters with similar stroke structure are encoded with the same code.

14. The device according to any one of claims 8, 9, and 10, wherein said representative code table is a conversional code table having characters encoded according to their relation between the complex Chinese system and the simplified Chinese system wherein characters that are corresponding in the complex Chinese system and the simplified Chinese system are encoded with the same code.

* * * * *